C. N. ALLERDING.
STEERING WHEEL.
APPLICATION FILED APR. 16, 1917.
1,271,257. Patented July 2, 1918.
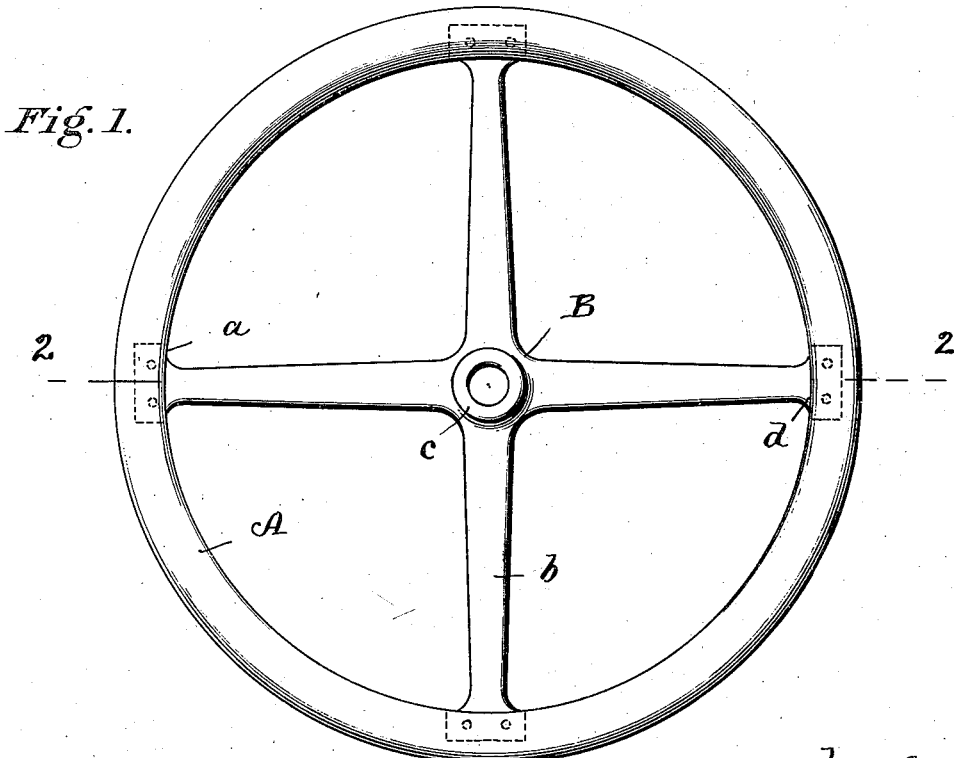
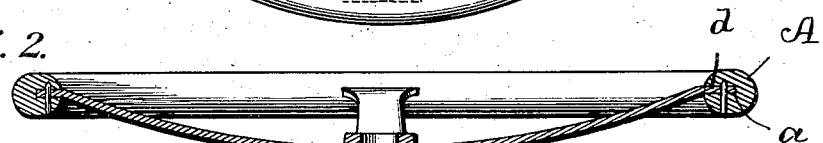
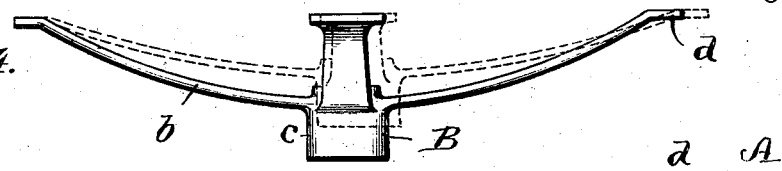
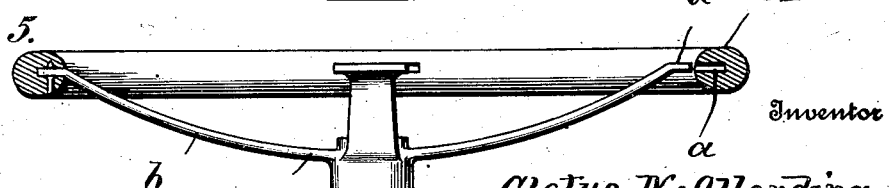
Witness
Ruth M. W. Koger
Inventor
Cletus N. Allerding
By Chamberlain & Newman
Attorney

UNITED STATES PATENT OFFICE.

CLETUS N. ALLERDING, OF MANSFIELD, OHIO.

STEERING-WHEEL.

1,271,257.　　　　　Specification of Letters Patent.　　Patented July 2, 1918.

Application filed April 16, 1917. Serial No. 162,265.

*To all whom it may concern:*

Be it known that I, CLETUS N. ALLERDING, a citizen of the United States, and resident of Mansfield, in the county of Richland and State of Ohio, have invented certain new and useful Improvements in Steering-Wheels, of which the following is a specification.

My invention relates to steering wheels for motor propelled vehicles.

One of the objects of the invention is to provide an improved form of steering wheel comprising but a few parts and thus designed to permit of its quick assemblage and insure a durable construction. The invention therefore particularly comprises a steering wheel that is formed of an annular rim portion which is provided with a series of pockets and an inner spider member that includes a central hub and a series of radially disposed arms to engage the pockets of the rim.

In providing steering wheels of this type it has been heretofore proposed to assemble a spider and hollow metallic rim, by forming the inner wall of such hollow rim with recesses or openings, and spreading the arms of the spider so as to force projections on the end of the arms into and through said holes.

Practically all steering wheels of this type employ wooden rims and metallic spiders, and it is particularly essential that the connection of the spider and rim be such as to leave the rim absolutely in original perfect condition, except at the points of connection with the spider, that these points of connection be rigid, and that the connection leave if possible no projection whatever other than that of the spider itself.

In combining the metal spider and wooden rim, through the spreading method of the arms of the spider, as heretofore practised with metallic rims, it is absolutely essential that the method employed be such that during the spreading operation there is absolutely no strain or stress put upon the rim, and that following the connection the bearing between the spider and rim be such that the connection is rigid with the maximum bearing surface, in order that the strain of use be distributed throughout a considerable area of the interior of the rim, to avoid breaking the rim in use.

The present invention therefore is particularly concerned with a method, and article resulting therefrom wherein the parts are initially so formed that in the spreading operation of the spider, absolutely no strain is put upon the rim, with its tendency to split or break the same, and that as the result of the formation of the parts the bearing of the spider arm terminals within the wooden rim will be against a very considerable portion of the cross area of such rim, to thereby distribute the strain of use, and consequently avoid the liability of a loosened connection or broken or marred rim through such strain.

A further object is to provide a steering wheel of few parts, cheap in construction, durable and safe in use, which can be assembled with facility and expedition.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification and upon which:

Figure 1 shows a plan view of my improved form of steering wheel complete.

Fig. 2 is a central vertical cross-section taken on line 2—2 of Fig. 1.

Fig. 3 is a similar cross-sectional view taken through the rim portion only of the wheel.

Fig. 4 is a side elevation of the spider member of the wheel, and

Fig. 5 is a sectional elevation of the rim and spider member, as in position for assembling.

Referring in detail to the characters of reference marked upon the drawings, A represents the rim of the wheel which in cross-section may be of any preferred form as shown, out of wood, rubber or other solid material. This rim is further provided upon its inner wall with a series of suitably shaped pockets *a* to receive the correspondingly shaped outer end portions of the spokes *b* of the spider B.

The central portion of the wheel which

I have designated as the spider is preferably made of yieldable metal and of a design commonly used for automobile steering wheels, except that the arms *b* are given a pronounced curve before assembly as between the hub *c* and their outer ends *d*, said curved lines being clearly indicated by the shapes shown in Figs. 4 and 5. In Fig. 4, the heavy lines show the original form of the spider, and the dotted lines show the shape of the arms after the bend of the arms have been reduced and the ends extended to the length required to form the connections with the rim. The extreme length from tip to tip of the spokes or arms *b*, before assembly, as indicated in these figures, is approximately equal to the inside diameter of the rim, plus the depth of one socket *a* when two of the ends or tips *d* of the spokes are placed into the socket *a* as indicated in Fig. 5.

After being arranged as above and positioned on a suitable form, pressure is applied to the convex side of the member B in a way to reduce the curve, thus spreading the arms and increasing their length from tip to tip and at the same time forcing them into the pockets *a* of the rim, thereby changing the shape of the spider from that shown in full lines in Figs. 4 and 5 to approximately that indicated by dotted lines in Fig. 4 and in full lines in Figs. 1 and 2.

The described method will be seen, therefore, to consist in forming a non-metallic solid rim with recesses opening only through the inner surface of the rim and otherwise of solid wall limitation; in forming the terminals of the spider arms so as to provide sections accurately corresponding in size and shape to such details of the recesses, and disposing these formed terminals at right angles to the axis of the spider. With the formed terminals assembled in the plane of the recesses, it is apparent that under the spreading action of the arms the said terminals will move into and accurately fill the recesses, the terminals moving in a plane at right angles to the axis of the spider, that is, directly in line with the recesses, and hence exerting no longitudinal or lateral strain on the walls of the recesses during such movement, and avoiding any liability to split the rim. Furthermore, when completed the full area of the formed terminals of the spider arms, on both the upper and lower surfaces, end and side walls, bears against a solid wall of the wooden rim, and hence all the strain on the connection incident to the use of the steering wheel is distributed over a comparatively large area of the interior surface of the rim. This again tends to maintain the permanency of the connection and avoids splitting or breaking of the rim in use.

Attention is called to the fact that the end of the spider arms are pressed into the pockets to force the ends in frictional contact with the walls of the pockets so that any leverage, jar or vibration is sustained by a frictional contact of the parts of large area, thereby making a firm, rigid and practically integral frictional contact between the parts, insuring safety in the manipulation of the steering wheel.

After being thus assembled suitable holes *e* are drilled through the rim A (if desired) and the ends of the arms or spokes *b* and pins or screws *f* inserted therein in the manner indicated in Fig. 2 of the drawings.

The foregoing construction obviously serves to securely attach the spider and rim member together without materially reducing the strength of the rim and in a very simple and inexpensive way, thereby producing a durable, practical and attractive design of wheel at a moderate cost.

Having thus described my invention, what I claim and desire to secure by Letters Patent is:—

1. The herein described method of combining a solid non-metallic rim and a spider having substantially dished arms to form a steering wheel, consisting in forming in the solid non-metallic rim a series of recesses opening through the inner surface of the rim and otherwise of solid wall limitation, forming the terminals of the spider arms to accurately correspond in size and shape to the recesses, and at right angles to the axis of the spider, arranging the spider with the formed terminals in line with the recesses, and spreading the arms of the spider to force the terminals into the recesses to completely fill the same.

2. A steering wheel comprising a solid wooden rim and a metallic spider, said rim being formed with recesses opening only through the inner surface of the rim and being of substantial dimensions circumferentially and transversely of the rim, the spider arms having terminals fitted into the recesses, said terminals being arranged at right angles to the axis of the spider and of a size and shape to completely fill the recesses, whereby the strain of use of the wheel is distributed throughout a very considerable area of the interior of the rim.

Signed at Mansfield, in the county of Richland and State of Ohio, this 12th day of March, A. D., 1917.

CLETUS N. ALLERDING.

Witnesses:
 O. M. GATES,
 PAUL F. SCHETTLER.